Figure 1:
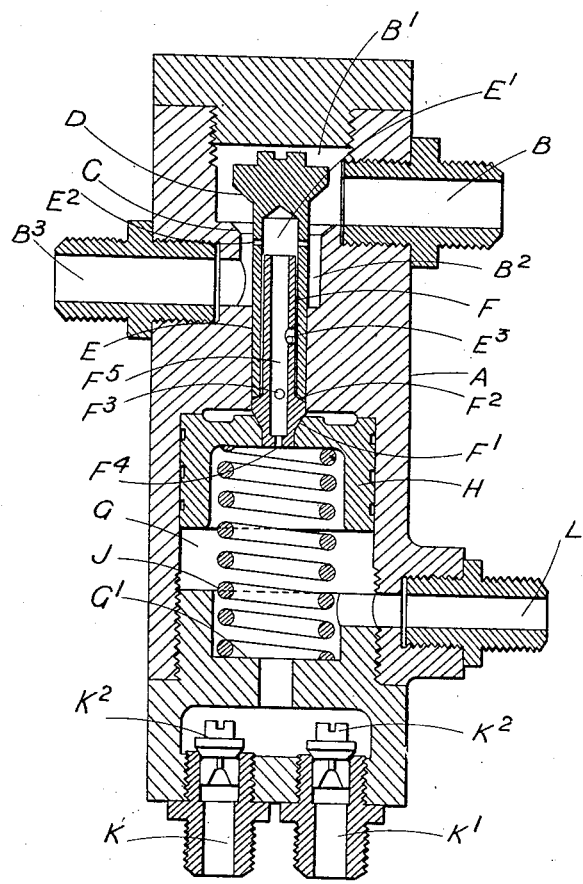

A. FORSTER AND J. H. BROWN.
AIR VALVE.
APPLICATION FILED JULY 15, 1918.

1,328,951.

Patented Jan. 27, 1920.
2 SHEETS—SHEET 1.

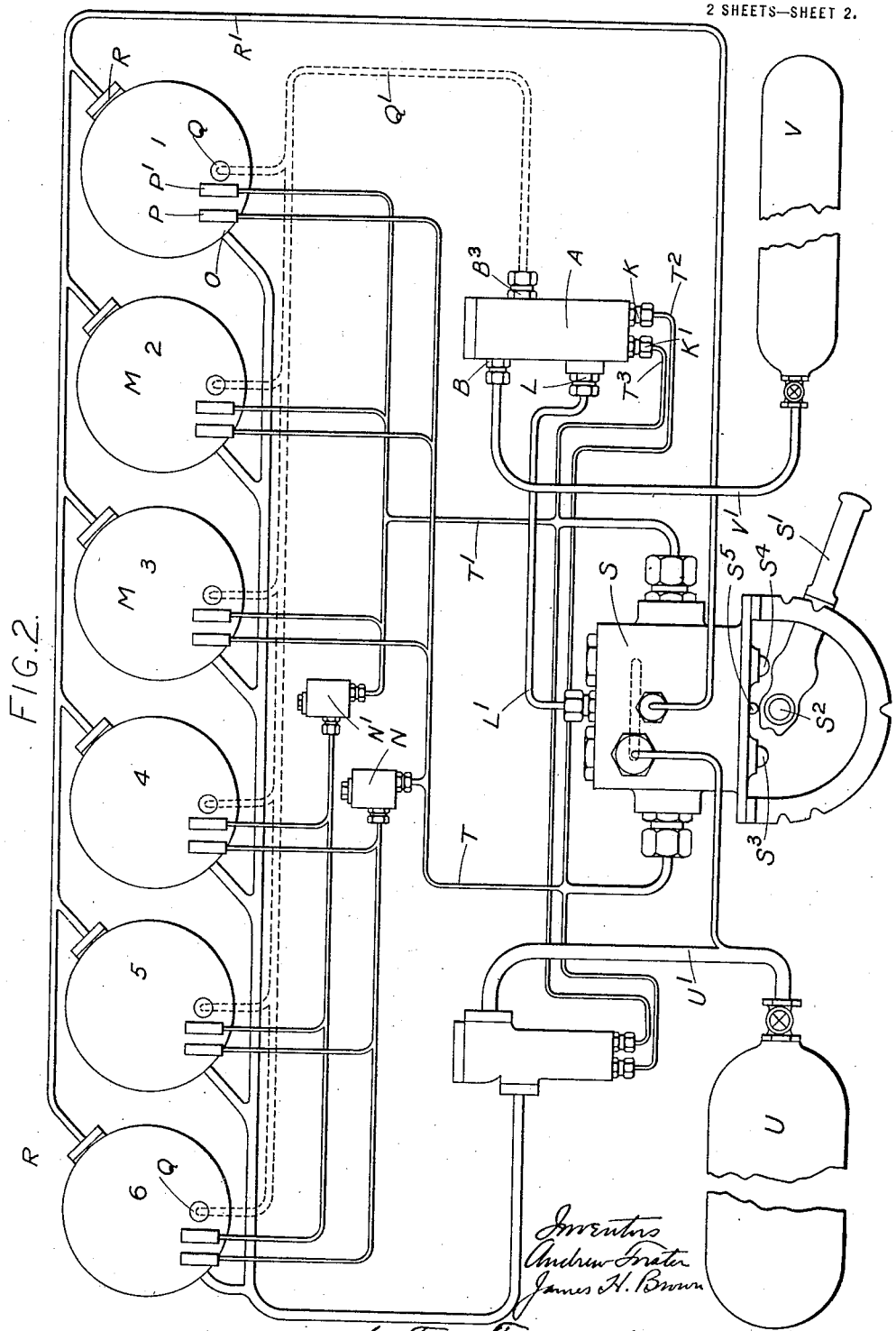

UNITED STATES PATENT OFFICE.

ANDREW FORSTER AND JAMES HENRY BROWN, OF COWES, ISLE OF WIGHT, ENGLAND, ASSIGNORS TO J. SAMUEL WHITE & COMPANY, LIMITED, OF EAST COWES, ISLE OF WIGHT, ENGLAND.

AIR-VALVE.

1,328,951.  Specification of Letters Patent.  Patented Jan. 27, 1920.

Application filed July 15, 1918. Serial No. 245,019.

*To all whom it may concern:*

Be it known that we, ANDREW FORSTER and JAMES HENRY BROWN, subjects of the King of England, both residing at Cowes, Isle of Wight, England, have invented an Improved Air-Valve, of which the following is a specification.

This invention relates to air valves intended for use in a system of pneumatic control for an internal combustion engine of the Diesel type as embodied in the present inventors' concurrent application for United States Letters Patent Serial No. 245,018, filed July 15, 1918, and has for its object to provide a valve by means of which the flow of air to the cylinder fuel valves can be controlled when starting, stopping and reversing the engine.

In the system in question a valve is disposed in the fuel injection air circuit and this valve is lifted off its seat when air is admitted to either of two starting air circuits respectively operative for running ahead or astern. The valve is closed when the engine is to be stopped and a separate clearing valve is opened. The present invention comprises a fuel injection air relay valve operative in this way to control the air supply to the cylinder fuel valves.

The accompanying drawings illustrate by way of example the preferred construction of the improved valve. In these drawings, Figure 1 is a longitudinal sectional elevation of the valve.

Fig. 2 is a diagrammatic view showing the disposition and manner of using the valve in one arrangement of the air control system embodied in the concurrent application above mentioned.

The valve as illustrated in Fig. 1 comprises a casing A through which toward one end is formed an air passage. This passage is composed of an inlet B leading into a chamber B' having formed in it a valve seat C below which is a chamber $B^2$ leading to an outlet $B^3$. A valve D is mounted on one end of a stem E which springs from the center of the conical face of the valve. The stem E is hollowed as at E' and one or more small radial passages $E^2$ are formed through the wall of the stem from the hollow interior and open into the chamber $B^2$ beneath the valve seat so that air can flow from this chamber into the interior of the valve stem. The lower end of the hollow part of the valve stem E is open and within the cylindrical interior slides a hollow plunger F the outer part of which is enlarged and its end is formed conical to constitute a valve F'.

The valve spindle E fits and can slide in a cylindrical passage formed in the casing A and extending between the chamber $B^2$ in the air passage and a cylindrical chamber G. The diameter of this chamber is greater than the diameter of the upper face of the valve D. As the spindle E slides in the casing the valve D will be lifted off the seat C or allowed to return on to its seat. In the cylindrical chamber G fits and can slide a piston H in the center of which is an opening in which is a valve seat adapted to be engaged by the conical valve F' on the end of the plunger F. When these parts are in engagement the main opening through the piston H is closed. The valve F' is formed at one end of the enlargement on the end of the plunger F and the other end of this enlargement is coned as at $F^2$ to constitute a valve which engages the internally coned open end of the valve spindle E. The enlarged end of the plunger F has a diameter equal to the external diameter of the valve spindle E and these parts are of such dimensions that when the valve D is seated the open end of the spindle E together with the enlarged end of the plunger F lie within one end of the cylinder G. The outward movement of the plunger F in the valve spindle E is limited by means of a suitably arranged stop or pin $E^3$ carried within the stem E. On the other hand the inward movement of the plunger F is determined by the engagement of the coned valve $F^2$ with the end of the valve stem E. A small opening $F^3$ is formed through the wall of the plunger F adjacent to its enlarged head and the valve $F^2$ so that when the plunger has moved outwardly from the valve stem this opening is uncovered but when the plunger has been pushed into the valve stem this opening will be closed. There is also a small hold $F^4$ which leads from the interior $F^5$ of the plunger F through the center of the face of the plunger valve F'. Air can thus flow from the chamber B² beneath the valve seat C through the openings E² into the valve stem E and thence through the hollow plunger F and openings F³ into the end of the cylinder G behind the piston H when the plunger F has moved outwardly. Air can also leak from the interior E' of the valve stem E and the interior F⁵ of the plunger F through the small opening F⁴ to the underside of the piston H.

The piston H is acted on by a coiled spring J which is disposed between the piston and the end G' of the cylinder G. This spring tends to move the piston H so as to cause the end of the plunger F to engage it and the valve D to be lifted off its seat. Two inlets K and K' each controlled by a non-return valve K² lead into the lower end of the cylinder G. These inlets K and K' communicate by pipes with the two starting air supply circuits in the control system. Leading laterally from the cylinder G is an outlet L whence runs a pipe to a hand operated clearing valve. Thus air under pressure when admitted to a starting air supply circuit can enter either at K or K' into the cylinder G and act on the piston H. On the other hand if the clearing valve is opened the pressure existent beneath the piston H is relieved and air can flow from the outlet L.

The chief features in the control system in which the above described valve is intended to be employed may now be referred to this system being diagrammatically shown in Fig. 2. In the case of a six cylinder engine the cylinders M are grouped in the connections to the control system in sets of three, cylinders Nos. 1, 2 and 3 for example being in one group while cylinders Nos. 4, 5 and 6 are in the other group. The time during which starting air is admitted to cylinders Nos. 4, 5 and 6 is controlled automatically by time or period valves N N' operative respectively when starting ahead or astern so that as soon as the crank shaft has been turned over by the pressure of the starting air sufficiently to make the pistons in the cylinders Nos. 1, 2 and 3 operative, or very shortly after this has occurred, the supply of starting air to cylinders Nos. 4, 5 and 6 is shut off by the valve N or N' and fuel is supplied to them while starting air continues to be delivered to cylinders Nos. 1, 2 and 3. The latter cylinders are then used to continue the turning of the crank shaft until the engine is fairly started by combustion in cylinders Nos. 4, 5 and 6 when the air supply to cylinders Nos. 1, 2 and 3 is cut off by the operation of the hand control and they run on the fuel delivered to them.

Each cylinder is provided with a starting air valve O whose operation is controlled by a pilot valve P for starting ahead and a similar pilot valve P' for starting astern. Each cylinder has a fuel valve Q which effects the injection of fuel by air under pressure admitted past the valve D in the casing A the injection taking place in the usual manner. The detail construction of the fuel valves may follow known lines. Each cylinder is also provided with the usual clearing or relief valve R.

A casing S contains two valves respectively operative for starting ahead and astern and a third valve for clearing. All these valves are operated by a single hand lever S' pivoted at S². The ends of the spindles or the parts operating on the spindles of these three valves are indicated in the drawing S³ being the ahead starting valve, S⁴ the astern starting valve and S⁵ the clearing valve. When the lever S' is moved into its extreme position to the left as viewed in Fig. 2 the ahead starting valve S³ will be lifted, when this lever is moved into its extreme position to the right the astern starting valve S⁴ will be lifted and when in a mid position the lever S' will lift the clearing valve S⁵.

From the casing S run two similar pipe systems T and T' which extend with branches respectively to all the ahead pilot valves P and to all the astern pilot valves P'. In each of these pipe circuits T T' is disposed a time or period valve N and N'. Air under pressure from a flask U is delivered by a branch from a pipe U' to the two starting valves in the casing S. This pipe U' also delivers air through a relay valve to all the cylinder starting valves O. Branch pipes T² and T³ run from the circuits T and T' to the inlets K and K' which lead into the cylinder G within the valve casing A. From a flask V which contains air under pressure a pipe V' runs to the inlet B which leads into the air passage chamber B' within the valve casing A. From the outlet B³ runs a pipe Q' having branches to the several cylinder fuel valves Q. From the outlet L which leads from the cylinder G in the casing A a pipe L' is carried to above the starting valve S⁵ in the casing S and from below this valve runs a pipe R' with branches to the several cylinder clearing valves R.

The action of the fuel injection air relay valve may now be described. When either of the hand operated starting valves S³ or S⁴ is opened air under pressure enters one or the other of the pipe circuits T or T' from the supply flask U and passes to the ahead or astern pilot valves P or P'. Supposing the ahead starting valve S³ to have thus been opened air will pass from the pipe circuit T through the branch pipe T² and inlet K into the cylinder G and by acting on the piston H will cause it to move upwardly in the cylinder. The plunger F will thereby be pushed into the valve stem E and the valve D will be lifted. Previous to this by opening a cock in the pipe V' air has been allowed to pass through this pipe from the supply flask V and the pressure of this air acts on the face of the valve D. When this valve has thus been lifted air will then flow from the inlet B through the chambers B' and B² and outlet B³ to all the cylinder fuel valves Q. The area of the piston H is greater than the area of the upper face of the valve D on which as explained can act directly the compressed air flowing through the pipe V' from the supply flask V, so that it becomes possible for this pressure to be overcome and the lifting of the valve D to be effected in the manner described. If there is a difference between the pressure of the air in the starting supply circuit T, that is to say the pressure in the cylinder G, and that from the supply flask V which acts on the valve D, equilibrium will be established by the leakage of air through the valve stem E and the small hole F⁴ in the face of the plunger valve F' to the under side of the piston H. When lifted the valve D will be held in its raised position by the action of the spring J on the piston H as the pressure has been relieved from the valve D. It will be apparent that the valve D will thus be lifted off its seat and air permitted to flow to the cylinder fuel valves Q whether the hand lever S' is positioned for starting ahead or for starting astern.

If it is desired to stop the engine the lever S' is put in its mid position so that the clearing valve S⁵ is lifted. This establishes communication between the cylinder G through the pipes L' and branched pipe R' and the cylinder clearing valves R, with the result that the air pressure beneath the piston H is at once relieved. The effect of this is to cause the valve D to be seated and to cut off the supply of air flowing to the fuel valves Q. Directly the pressure beneath the piston H is relieved this piston moves downward and consequently the plunger F is free to move outwardly in the valve stem E so that the opening F³ is uncovered and air can flow back from the pipe Q' and chamber B² beneath the valve D by way of the valve stem E and plunger F into the upper end of the cylinder G behind the piston H. This will cause this piston to move still farther in the downward direction until it leaves the plunger valve F' behind. When this valve is thus off its seat in the opening in the piston H air can flow freely into the cylinder G below the piston. Air under pressure in this way can pass through the pipe L' past the hand operated clearing valve S⁵ and through the pipe R' to the several cylinder clearing valves R. The pressure of this air will open these valves and relieve the cylinders A of all pressure and unconsumed gases. The engine will then stop and be ready to be started again in either direction.

It will thus be seen that the above described automatic air injection relay valve is in communication with and actuated by the air pressure in both of the starting air supply circuits T and T' and this valve controls in the manner described the flow of injection air to the fuel valves Q of all the cylinders of the engine. The detail construction and arrangement adopted in this fuel injection air relay valve may vary but in each case it is such that when air under pressure is admitted into a starting air supply circuit T or T' the pressure will cause the valve D to be lifted and permit air to flow from the flask V to the fuel injectors Q. Directly however the pressure beneath the piston H is relieved by operation of the hand clearing valve, the closing of the valve D will be effected and the pressure of the residual air in the pipe Q' will be utilized to operate the cylinder clearing valve R as the engine stops.

What we claim as our invention and desire to secure by Letters Patent is:—

1. In a valve for controlling the flow of air to the fuel valves of an internal combustion engine of the Diesel type, the combination of a casing, a passage for compressed air formed through this casing, a valve seat in this passage, a valve spindle which can slide in the casing, a valve mounted on one end of this spindle and adapted to engage the seat in the air passage, a cylindrical chamber in the casing having a diameter greater than that of the valve face, a piston fitting and movable within the cylindrical chamber, means whereby the piston when moved in one direction by compressed air is caused to act on the valve and lift it off its seat, and means whereby the valve is caused to return to its seat when the piston is moved in the opposite direction as a result of reduction in the air pressure beneath it as set forth.

2. In a valve for controlling the flow of air to the fuel valves of an internal combustion engine of the Diesel type, the combination of a casing, a passage for compressed air formed through this casing, a valve seat in this passage, a valve spindle which can slide in the casing, a valve mounted on one end of this spindle and adapted to engage the seat in the air passage, a cylindrical chamber in the casing having a diameter greater than that of the valve face, a piston fitting and movable within the cylindrical chamber, means whereby the piston when moved in one direction by compressed air is caused to act on the valve and lift it off its seat, means whereby the valve is caused to return to its seat when the piston is moved in the opposite direction as a result of reduction in the air pressure beneath it, and means whereby air in the passage beneath the valve seat and in the piping connected thereto is permitted to flow into the cylindrical chamber as the valve is seated as set forth.

3. In a valve for controlling the flow of air to the fuel valves of an internal combustion engine of the Diesel type, the combination of a casing, a passage for compressed air formed in this casing, a valve seat in this passage, an inlet to this passage above the valve seat, an outlet from this passage below the valve seat, a valve spindle which can slide in the casing, a valve mounted on one end of this spindle and adapted to engage the seat in the air passage, a cylindrical chamber in the casing having a diameter greater than that of the valve face, a piston fitting and movable within the cylindrical chamber, means whereby the piston when moved in one direction by compressed air is caused to act upon the valve and lift it off its seat, means whereby the valve is caused to return to its seat when the piston is moved in the opposite direction as a result of reduction in the air pressure beneath it, and means whereby air in the passage beneath the valve seat and in the pipe connected thereto is permitted to flow into the cylindrical chamber as the valve is seated as set forth.

4. In a valve for controlling the flow of air to the fuel valves of an internal combustion engine of the Diesel type, the combination of a casing, a passage for compressed air formed through this casing, a valve seat in this passage, a hollow spindle one end of which is closed and having a lateral opening through its wall positioned near the closed end, a valve mounted in the closed end of the spindle and adapted to engage the seat in the air passage, a cylindrical chamber in the casing having a diameter greater than the face of the valve, a piston in which is a central opening fitting and movable within the cylindrical chamber, a passage extending between the cylindrical chamber and a point in the air passage beneath the valve seat in which passage the valve spindle fits and can slide, a hollow member disposed between the valve spindle and the piston and through which the piston when moved in one direction can act on the valve spindle and lift the valve off its seat this member serving to control the flow of air from the air passage through the valve spindle to both sides of the piston, a spring which acts on the piston in a direction tending to lift the valve off its seat, an inlet to the cylindrical chamber, and an outlet from this chamber as set forth.

5. In a valve for controlling the flow of air to the fuel valves of an internal combustion engine of the Diesel type, the combination of a casing, a passage for compressed air formed in this casing, a valve seat in this passage, an inlet to this passage above the valve seat, an outlet from this passage below the valve seat, a hollow spindle one end of which is closed and having a lateral opening through its wall positioned near the closed end, a valve mounted on the closed end of the spindle and adapted to engage the seat in the air passage, a cylindrical chamber in the casing having a diameter greater than the face of the valve, a piston in which is a central opening fitting and movable within the cylindrical chamber, a passage extending between the cylindrical chamber and a point in the air passage beneath the valve seat in which passage the valve spindle fits and can slide, a hollow member disposed between the valve spindle and the piston and through which the piston when moved in one direction can act on the valve spindle and lift the valve off its seat this member serving to control the flow of air from the air passage through the valve spindle to both sides of the piston, a spring which acts on the piston in a direction tending to lift the valve off its seat, an inlet to the cylindrical chamber, and an outlet from this chamber as set forth.

6. In a valve for controlling the flow of air to the fuel valves of an internal combustion engine of the Diesel type, the combination of a casing, a passage for compressed air formed through this casing, a valve seat in this passage, a hollow spindle one end of which is closed and having a lateral opening through its wall near the closed end, a valve mounted on the closed end of the spindle and adapted to engage the seat in the air passage, a cylindrical chamber in the casing having a diameter greater than the face of the valve, a piston in which is a central opening fitting and movable within the cylindrical chamber, a passage extending between the cylindrical chamber and a point in the air passage beneath the valve seat in which passage the valve spindle fits and can slide, a tubular member formed to engage the open end of the valve spindle and the opening in the piston and serving to transmit movement from the piston to the valve and to control the flow of air from the air passage through the valve spindle to both sides of the piston, a spring which acts on the piston in a direction tending to lift the valve off its seat, an inlet to the cylindrical chamber, and an outlet from this chamber as set forth.

7. In a valve for controlling the flow of air to the fuel valves of an internal combustion engine of the Diesel type, the combination of a casing, a passage for compressed air formed through this casing, a valve seat in this passage, a hollow spindle one end of which is closed and having a lateral opening through its wall near the closed end, a valve mounted on the closed end of the spindle and adapted to engage the seat in the air passage, a cylindrical chamber in the casing having a diameter greater than the face of the valve, a piston in which is a central opening fitting and movable within the cylindrical chamber, a passage extending between the cylindrical chamber and a point in the air passage beneath the valve seat in which passage the valve spindle fits and can slide, a tubular member which as to one part fits and slides within and can engage the open end of the valve spindle while the other part of this member projects from the valve spindle and is adapted to engage the opening in the piston this member being operative to control the flow of air from the air passage through the valve spindle to both sides of the piston, a spring which acts on the piston in a direction tending to lift the valve off its seat, an inlet to the cylindrical chamber, and an outlet from this chamber as set forth.

8. In a valve for controlling the flow of air to the fuel valves of an internal combustion engine of the Diesel type, the combination of a casing, a passage for compressed air formed through this casing, a valve seat in this passage, a hollow spindle one end of which is closed and having a lateral opening through its wall near the closed end, a valve mounted on the closed end of the spindle and adapted to engage the seat in the air passage, a cylindrical chamber in the casing having a diameter greater than the face of the valve, a piston in which is a central opening fitting and movable within the cylindrical chamber, a passage extending between the cylindrical chamber and a point in the air passage beneath the valve seat in which passage the valve spindle fits and can slide, a tubular member which fits and can slide within the open end of the valve spindle, an enlargement on this tubular member adapted at one end thereof to engage the end of the valve spindle and at the other end to engage the opening in the piston, a closure for the outer end of this tubular member in which closure is a small opening, a lateral opening though the wall of the tubular member positioned where it will be uncovered when the member slides a short distance out of the valve spindle, a spring which acts on the piston in a direction tending to lift the valve off its seat, an inlet to the cylindrical chamber, and an outlet from this chamber as set forth.

9. In a valve for controlling the flow of air to the fuel valves of an internal combustion engine of the Diesel type, the combination of a casing, a passage for compressed air formed in this casing, a valve seat in this passage, an inlet to this passage above the valve seat, an outlet from this passage below the valve seat, a hollow spindle one end of which is closed and having a lateral opening through its wall positioned near the closed end, a valve mounted on the closed end of the spindle and adapted to engage the seat in the air passage, a cylindrical chamber in the casing having a diameter greater than the face of the valve, a piston in which is a central opening fitting and movable within the cylindrical chamber, a passage extending between the cylindrical chamber and a point in the air passage beneath the valve seat in which passage the valve spindle fits and can slide, a tubular member formed to engage the open end of the valve spindle and the opening in the piston and serving to transmit movement from the piston to the valve and to control the flow of air from the air passage through the valve spindle to both sides of the piston, a spring which acts on the piston in a direction tending to lift the valve off its seat, an inlet to the cylindrical chamber, and an outlet from this chamber as set forth.

10. In a valve for controlling the flow of air to the fuel valves of an internal combustion engine of the Diesel type, the combination of a casing, a passage for compressed air formed in this casing, a valve seat in this passage, an inlet to this passage above the valve seat, an outlet from this passage below the valve seat, a hollow spindle one end of which is closed and having a lateral opening through its wall positioned near the closed end, a valve mounted on the closed end of the spindle and adapted to engage the seat in the air passage, a cylindrical chamber in the casing having a diameter greater than the face of the valve, a piston in which is a central opening fitting and movable within the cylindrical chamber, a passage extending between the cylindrical chamber and a point in the air passage beneath the valve seat in which passage the valve spindle fits and can slide, a tubular member which as to one part fits and slides within and can engage the open end of the valve spindle while the other part of this member projects from the valve spindle and is adapted to engage the opening in the piston this member being operative to control the flow of air from the air passage through the valve spindle to both sides of the piston, means for limiting the outward sliding movement of the tubular member in the valve spindle, a spring which acts on the piston in a direction tending to lift the valve off its seat, an inlet to the cylindrical chamber, and an outlet from this chamber as set forth.

11. In a valve for controlling the flow of air to the fuel valves of an internal combustion engine of the Diesel type, the combination of a casing, a passage for compressed air formed in this casing, a valve seat in this passage, an inlet to this passage above the valve seat, an outlet from this passage below the valve seat, a hollow spindle one end of which is closed and having a lateral opening through its wall positioned near the closed end, a valve mounted on the closed end of the spindle and adapted to engage the seat in the air passage, a cylindrical chamber in the casing having a diameter greater than the face of the valve, a piston in which is a central opening fitting and movable within the cylindrical chamber, a passage extending between the cylindrical chamber and a point in the air passage beneath the valve seat in which passage the valve spindle fits and can slide, a tubular member which fits and can slide within the open end of the valve spindle, an enlargement on this tubular member adapted at one end to engage the open end of the valve spindle and at the other end to engage the opening in the piston, a closure for the outer end of this tubular member in which closure is a small opening, a lateral opening through the wall of the tubular member positioned where it will be uncovered when the member slides a short distance out of the valve spindle, a spring which acts on the piston in a direction tending to lift the valve off its seat, an inlet to the cylindrical chamber, and an outlet from this chamber as set forth.

12. In a valve for controlling the flow of air to the fuel valves of an internal combustion engine of the Diesel type, the combination of a casing, a passage for compressed air formed in this casing, a valve seat in this passage, an inlet to this passage above the valve seat, an outlet from this passage below the valve seat, a hollow spindle one end of which is closed and having a lateral opening through its wall positioned near the closed end, a valve mounted on the closed end of this spindle and adapted to engage the seat in the air passage, a cylindrical chamber in the casing having a greater diameter than the face of the valve, a piston in which is a central opening fitting and movable within the cylindrical chamber, a passage extending between the cylindrical chamber and a point in the air passage beneath the valve seat in which passage the valve spindle fits and can slide, a tubular member which fits and can slide within the open end of the valve spindle, an enlargement on this tubular member adapted at one end to engage the open end of the valve spindle and at the other end to engage the opening in the piston, a closure for the outer end of this tubular member in which closure is a small opening, a lateral opening through the wall of the tubular member positioned where it will be uncovered when the member slides a short distance out of the valve spindle, means for limiting the outward sliding movement of the tubular member in the valve spindle, an inlet to the cylindrical chamber, a non-return valve seated in this inlet, and an outlet from this chamber as set forth.

In testimony whereof we have signed our names to this specification.

ANDREW FORSTER.
JAMES HENRY BROWN.